US008458044B2

(12) United States Patent
Blair et al.

(10) Patent No.: US 8,458,044 B2
(45) Date of Patent: Jun. 4, 2013

(54) DYNAMIC GROUP OFFER PROCESS FOR DIRECT SALES SYSTEM EMPLOYING NETWORKED MOBILE COMPUTING DEVICES

(75) Inventors: Ryan Blair, Los Angeles, CA (US); Jade Makani Roberge Charles, San Diego, CA (US)

(73) Assignee: Fragmob, LLC, San Diego, CA (US)

( * ) Notice: Subject to any disclaimer, the term of this patent is extended or adjusted under 35 U.S.C. 154(b) by 0 days.

(21) Appl. No.: 13/531,095

(22) Filed: Jun. 22, 2012

(65) Prior Publication Data

US 2013/0110597 A1    May 2, 2013

Related U.S. Application Data

(63) Continuation-in-part of application No. 13/282,419, filed on Oct. 26, 2011.

(51) Int. Cl.
*G06Q 30/00* (2012.01)
(52) U.S. Cl.
USPC .................. 705/26.1; 705/26.2; 705/26.4
(58) Field of Classification Search
USPC ............................................. 705/26.1
See application file for complete search history.

(56) References Cited

U.S. PATENT DOCUMENTS

| 6,101,484 | A * | 8/2000 | Halbert et al. ............... 705/26.2 |
| 6,269,343 | B1 * | 7/2001 | Pallakoff ..................... 705/26.2 |
| 7,392,215 | B1 * | 6/2008 | Bril ............................. 705/37 |
| 7,835,977 | B2 * | 11/2010 | Singh et al. ................... 705/37 |
| 8,290,824 | B1 * | 10/2012 | Mesaros ...................... 705/26.2 |
| 8,311,896 | B2 * | 11/2012 | Mesaros ...................... 705/26.2 |
| 2009/0276305 | A1 * | 11/2009 | Clopp ......................... 705/14.16 |
| 2010/0287044 | A1 * | 11/2010 | Mason ........................ 705/14.13 |
| 2010/0287103 | A1 * | 11/2010 | Mason ............................ 705/80 |
| 2011/0288951 | A1 * | 11/2011 | McKenzie ................... 705/26.2 |
| 2012/0030048 | A1 * | 2/2012 | Manley et al. ............... 705/26.1 |
| 2012/0030123 | A1 * | 2/2012 | Ocko ............................ 705/304 |
| 2012/0109732 | A1 * | 5/2012 | Jaffe ........................... 705/14.25 |

(Continued)

FOREIGN PATENT DOCUMENTS

EP    1077422 A2 *    2/2001

OTHER PUBLICATIONS

Anand et al., Group Buying on the Web: A Comparison of Price—Discovery Mechanisms, Nov. 2003, Management Science, vol. 49, No. 11, pp. 1546-1562.*

(Continued)

*Primary Examiner* — Bradley B Bayat
(74) *Attorney, Agent, or Firm* — Mark Terry

(57) ABSTRACT

A method on a server for managing discount offers for a plurality of users over a communications network. The method includes receiving a discount offer, wherein a discount offer comprises at least a product or service description, an initial price, a discount price less than the initial price, a minimum number of acceptances and a time deadline, and transmitting the discount offer to the plurality of users. The method further includes receiving acceptances of the discount offer, and detecting attainment of a predefined time before the time deadline. The method further includes decreasing the minimum number of acceptances by a numerical decrement, if the number of acceptances is less than the minimum number of acceptances at the predefined time before the time deadline, and re-transmitting the discount offer with a decreased minimum number of acceptances to the mobile computers of the plurality of users.

17 Claims, 9 Drawing Sheets

U.S. PATENT DOCUMENTS

| | | | |
|---|---|---|---|
| 2012/0179516 A1* | 7/2012 | Fakhrai et al. | 705/14.1 |
| 2012/0197720 A1* | 8/2012 | Bezancon et al. | 705/14.53 |
| 2012/0239505 A1* | 9/2012 | Hu et al. | 705/14.66 |
| 2012/0253901 A1* | 10/2012 | Montgomery et al. | 705/14.5 |
| 2012/0265600 A1* | 10/2012 | Mesaros | 705/14.35 |
| 2012/0310764 A1* | 12/2012 | Sinsheimer et al. | 705/26.2 |
| 2013/0006741 A1* | 1/2013 | Mesaros | 705/14.23 |

OTHER PUBLICATIONS

Kauffman et al., Bid Together, Buy Together, May 16, 2001, Carlson School of Management.*

* cited by examiner

TIERED DISCOUNT OFFER

| Quantity of Product Sold | Per Unit Price of Product |
|---|---|
| 0-100 | $150 |
| 100-200 | $100 |
| 200-300 | $75 |
| >300 | $50 |

FIG. 5

US 8,458,044 B2

DYNAMIC GROUP OFFER PROCESS FOR DIRECT SALES SYSTEM EMPLOYING NETWORKED MOBILE COMPUTING DEVICES

CROSS-REFERENCE TO RELATED APPLICATIONS

This patent application is a continuation-in-part of, and claims priority to, U.S. patent application Ser. No. 13/282, 419, filed Oct. 26, 2011, titled "Group Offers for Direct Sales System Employing Networked Mobile Computing Devices." The subject matter of U.S. patent application Ser. No. 13/282, 419 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of sales, advertising and marketing and, more specifically, the present invention relates to the field of direct sales activities on electronic devices.

BACKGROUND OF THE INVENTION

The present invention relates to direct sales activities of all types. Direct selling is the marketing and selling of products directly to consumers away from a fixed retail location. Modern direct selling includes sales made through a party plan, one-on-one demonstrations, and other personal contact arrangements, as well as internet sales. Thus, direct sales include direct personal presentation, product demonstration, and sales of products and services to consumers, usually in their homes or at their jobs. One form of direct selling includes multi-level marketing (MLM), which is a marketing strategy in which a sales force is compensated not only for product sales they personally generate, but also for the product sales of others they recruit, thereby creating a downstream of distributors and a hierarchy of multiple levels of compensation.

Moreover, there is a need to offer discounts to consumers of direct sales. Discounts are an integral part of retail strategies for many goods and services. Vendors rely upon discounts for a variety of reasons, such as to promote new and existing goods and services and to increase the sales of that particular item or service, or to increase the sales of the merchant's other goods and services. Further, consumers rely upon discounts as a way to reduce their costs. Discount techniques include providing coupons and rebates to potential customers, but these techniques have several disadvantages, such as a historically small percentage of consumer participation and fraud. Further, advertising and marketing associated with coupons and rebates can be expensive when done through the radio or television medium, and extremely ineffective when done through print advertisements. Regardless of the advertising medium, however, there is very little reason for the consumer to pass along the advertisement or coupon to others, so that a merchant must advertise or market the discount to each individual.

Another drawback of current discount techniques includes the risk taken by the vendor due to an inadequate sales volume. A vendor offers coupons or rebates in the hopes of securing future sales at full retail prices, repeat sales and ultimately an increase in overall sales. Ultimately, vendors cannot offer goods and services at a discount unless the vendor can ensure a minimum number of sales to justify the discount. But there is currently no system to mutually satisfy a consumer with a discount and the vendor with a minimum number of sales. There is also no current system that utilizes the strength of a social network to distribute information about the discounts, and create an incentive to distribute the information about the discount.

Yet another drawback of current group discount techniques involves the inability to adjust them after they have been deployed. A common problem occurs when a group discount offer is underway and comes close to, but fails to meet, the minimum number of sales required by the merchant. Even if the group discount fails to meet the minimum number of sales required by one sale, the group discount will not be triggered, thereby allowing the merchant to lose all of the sales that may have occurred. The inflexible nature of conventional group discounts result in a sales mechanism that is less usable and less desirable.

Therefore, what is needed is a system and method for improving the problems with the prior art, and more particularly for a more efficient method and system for facilitating direct sales activities by offering flexible group discounts.

BRIEF SUMMARY OF THE INVENTION

In one embodiment, the present invention discloses a method on a server for managing discount offers for a plurality of users over a communications network. The method includes receiving a discount offer, wherein a discount offer comprises at least a product or service description, an initial price, a discount price less than the initial price, a minimum number of acceptances of the discount offer that are required to trigger the discount price and a time deadline for the discount offer, and transmitting the discount offer to mobile computers of the plurality of users via the communications network. The method further includes receiving acceptances of the discount offer from the mobile computers of the plurality of users, and detecting attainment of a predefined time before the time deadline. The method further includes decreasing the minimum number of acceptances by an increment, if the number of acceptances is less than the minimum number of acceptances at the predefined time before the time deadline, and re-transmitting the discount offer with a decreased minimum number of acceptances to the mobile computers of the plurality of users.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 5 is a chart showing a tiered discount offer, according to one embodiment of the present invention.

DETAILED DESCRIPTION OF THE INVENTION

Figure 1:
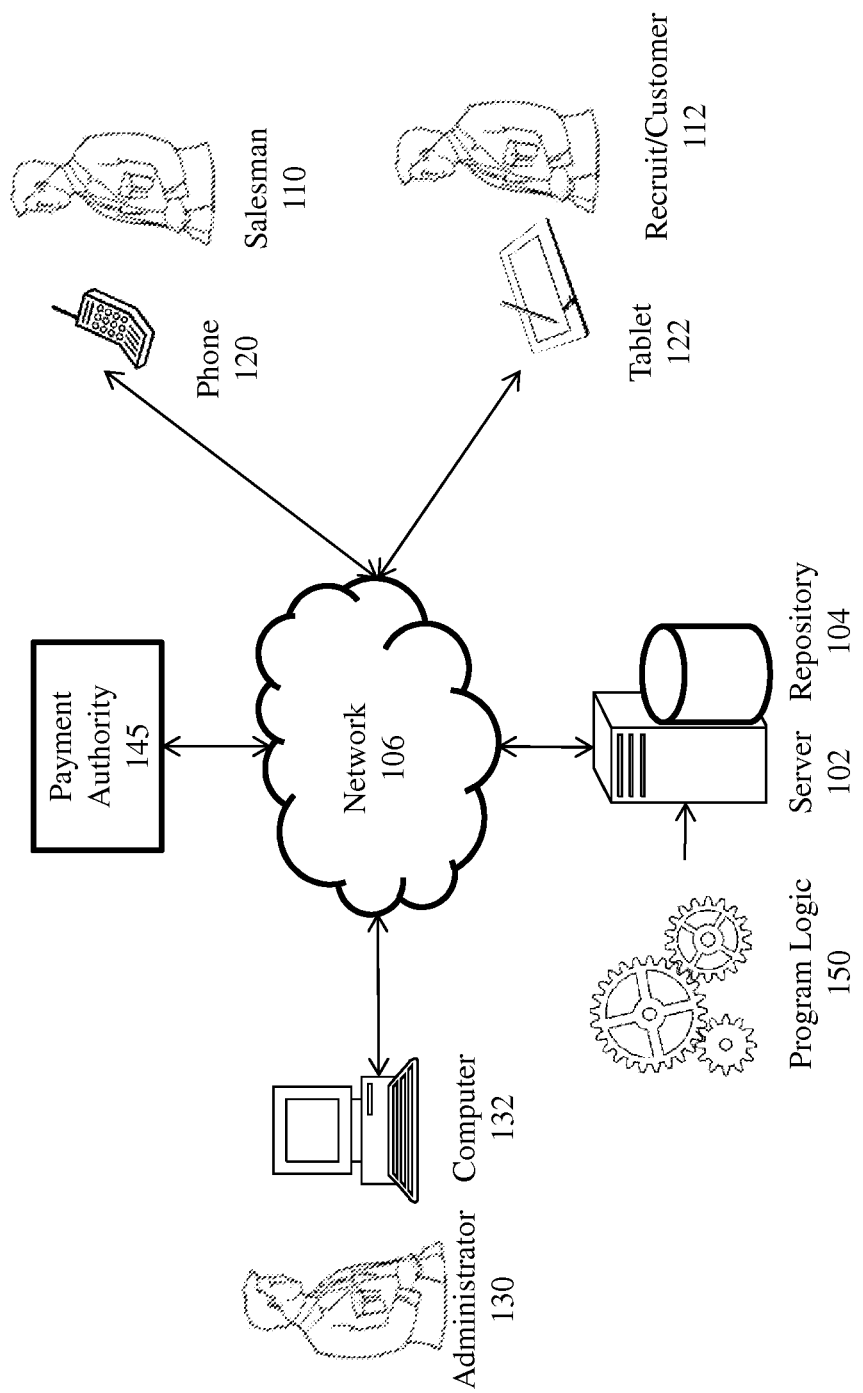
FIG. 1 is a block diagram illustrating the network architecture of a system for providing management of sales activities, discount offers and data over a communications network, in accordance with one embodiment of the present invention.

The present invention improves upon the problems with the prior art by providing a discount offer or group buying offer that allows for certain aspects of the discount offer to change dynamically. The present invention allows for the time deadline, the discount provided, the minimum number of acceptances and/or the number of products/services of the discount offer to be modified automatically after the discount offer has been deployed and while the discount offer is underway. Also, the time deadline, the discount provided, the minimum number of acceptances and/or the number of products/services of the discount offer may be modified proportionally to the current situation, such as the current number of acceptances of the discount offer. This feature of the invention allows the discount offer to change on-the-fly according to current empirical data about the discount offer, so as to dynamically create a discount offer that is more likely to result in final sales. The present invention is further advantageous since it allows discount offers to be tailored according to current market conditions. The present invention is also beneficial because greater discounts and unit increases of the products/services entice and persuade consumers to accept the discount offer and effectuate a sale.

Additionally, the present invention improves upon the problems with the prior art by providing a discount offer method that provides discounts for consumers while at the same time providing a minimum number of discounted sales for vendors. Group buying, also known as collective buying, offers products and services at significantly reduced prices on the condition that a minimum number of buyers make the purchase. The present invention also utilizes the strength of a social network, along with a guarantee that the discounted price will only have to be honored if a minimum number of customers accept the discount offer or group buying offer for the goods or services. Accordingly, a vendor can provide a greater or deeper discount knowing that at least a certain number of sales will occur at that discount.

The present invention further provides a system that grants commissions for the discounted sales to the users that recruited the buyers, thereby providing an incentive for recruiters to push the discount offers or group buying offers. This provides a triple-incentive system whereby a) consumers have a financial incentive to purchase discounted goods or services via the discount offers, b) the recruiters of the consumers have an incentive (i.e., a commission) to persuade the consumers to purchase the discounted goods or services, and c) consumers have a financial incentive to persuade other consumers to purchase the discounted goods or services, since additional acceptances of the discount offer could lead to additional discounts to all accepting consumers.

Finally, the present invention improves upon the prior art by providing technologically advanced methods for advertising and promotion in a direct sales environment using mobile technology. The present invention employs the use of push technology to push offers, promotions and ads to customers and salesmen. This is advantageous as it facilitates commerce over a communications network and speeds up the process of fielding offers, promotions and ads to a large sales force.

Referring now to the drawing figures in which like reference designators refer to like elements, there is shown in FIG. 1 an illustration of a block diagram showing the network architecture of a system and method for providing management of direct sales activities, discount offers and data over a communications network in accordance with the principles of the present invention. The most prominent element of FIG. 1 is the server 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for the functionality that executes on computers 120, 122 and 132, namely, the processing of sales transactions, as well as the processing of discount offers, all of which are provided to the users 110, 112 and 130, wherein the provision of the foregoing services and data facilitates the performance of direct sales activities.

FIG. 1 further includes mobile computers 120 and 122, which may be smart phones, mobile phones, tablet computers, handheld computers, laptops, or the like. Mobile computers 120 and 122 correspond to a salesman 110 and a recruit or customer 112 of the salesman 112. A salesman 110, also known as a distributor, is a member of a direct sales force who sells products to customers and recruits others to do the same. A salesman's recruits may also be known as distributors. A salesman 110 receives compensation for his own product sales, as well as the sales of his recruits, often via a commission. A customer simply refers to a person to whom a salesmen sales products or services. Computer 132 corresponds to an administrator 130, who may perform supervisory or administrative tasks on server 102. Administrator 130 may, for example, set sales milestones for the users 110, 112 and prepare and disseminate discount offers. Computer 132 may be a mobile computer, a desktop computer, a common computer terminal or the like.

FIG. 1 further shows that server 102 includes a database or repository 104, which may be a relational database comprising a Structured Query Language (SQL) database stored in a SQL server. Client computers 120, 122 and 132 may also each include their own database. The repository 104 serves data from a database, which is a repository for data used by server 102 and the client computers during the course of operation of the invention.

The database 104 may include a user record for each salesman 110 and recruit or customer 112. A user record may include: contact/identifying information for the user, contact/identifying information for the participant that recruited the user (if any), information pertaining to sales attributed to the user, contact/identifying information for recruits of the user, information pertaining to recruitment activity of the user, information pertaining to sales attributed to recruits of the user, electronic payment information for the user, information pertaining to calls made by the user, information pertaining to the purchases made by the user, etc. A user record may also include a unique identifier for each user, a residential address for each user, the current location of each user (based on location-based services from the user's mobile computer) and a description of past products purchased by each user. A user record may further include demographic data for each user, such as age, sex, income data, race, color, marital status, etc. Recruit enrollment data includes any data that is entered into a user record for a recruit or customer 112 when the recruit or customer is recruited and enrolled by a salesman 112.

Sales transaction data, for example, may be stored in the database 104 and associated with a record for the user initiating the sale and/or the customer purchasing products or services. Sales transaction data may include one or more product identifiers, one or more product amounts, buyer contact/identifying information, product shipping information and electronic payment information. In one embodiment, electronic payment information may comprise buyer contact/identifying information, credit card data garnered from a credit or debit card and authentication information. Recruitment activity data, for example, may also be stored in the database 104 and associated with a record for the user performing the recruitment. Recruitment activity data may include contact/identifying information for prospective and active recruits, updates on follow up communications with prospective and active recruits, information pertaining to phone calls with prospective and active recruits, and status information for prospective and active recruits.

The database 104 may also include a record for each administrator 130. A record for an administrator may include: commission data that defines how salesmen are compensated for their own sales, commission data that defines how salesmen are compensated for the sales of their recruits, milestone data that defines thresholds that result in an award, personal sales goals, group sales goals, discount offers, etc.

The database 104 may further include a record for each discount offer or group buying offer created by a user, such as administrative user 130. A discount offer or group buying offer may comprise a product or service description, an image of the product or service, an initial price of the product or service, a first discount price, a first minimum number of acceptances of the offer that are required to trigger the first discount price, an expiration date and time for the offer (i.e., a time deadline for the discount offer), a current number of acceptances of the offer, computer program code that comprises a countdown timer that counts down to the time at which the offer expires (defined in greater detail below), etc. In another embodiment, a group buying offer may comprises a tiered discount system wherein a first number of acceptances triggers a first discount price lower than the initial price, a second (higher) number of acceptances triggers a second (lower) discount price, a third (even higher) number of acceptances triggers a third (even lower) discount price, and so on and so forth. See FIG. 5 for an example of a tiered discount offer.

In one embodiment, a discount offer or group buying offer may further define an upper boundary or boundary, which refers to a number of acceptances over a minimum number of acceptances that triggers the addition of a new tier. In the case of a discount offer having no tiers (simply a minimum number of acceptances, which triggers a discount price), if the current discount offer or group buying offer experiences a number of acceptances that surpasses the pre-defined boundary for the discount offer (which may be higher than the minimum number of acceptances for that offer), then an additional tier is added, thereby defining a second (higher) minimum number of acceptances and a second (lower) discount price that shall be triggered when the second minimum number of acceptances is reached. In another embodiment, a discount offer or group buying offer may further define multiple predefined boundaries that result in additional tiers that are added when certain numbers of acceptances are reached.

In the case of a multi-tiered discount offer having multiple tiers, if the current discount offer experiences a number of acceptances that meets or surpasses the pre-defined boundary for the discount offer (which may be higher than the minimum number of acceptances for the highest tier of the offer), then an additional tier is added, thereby defining a higher minimum number of acceptances and a lower discount price that shall be triggered when the higher minimum number of acceptances is reached. In another embodiment, a multi-tiered discount offer or group buying offer may further define multiple predefined boundaries that result in additional tiers that are added when certain numbers of acceptances are reached.

FIG. 1 shows an embodiment of the present invention wherein networked computing devices 120, 122 and 132 interact with server 102 and repository 104 over the network 106. Server 102 includes a software engine that delivers applications, data, program code and other information to networked computing devices 120, 122 and 132. The software engine of server 102 may perform other processes such as audio and/or video streaming or other standards for transferring multimedia data in a stream of packets that are interpreted and rendered by a software application as the packets arrive. It should be noted that although FIG. 1 shows only three networked computing devices 120, 122 and 132, the system of the present invention supports any number of networked computing devices connected via network 106.

Server 102 includes program logic 150 comprising computer source code, scripting language code or interpreted language code that is compiled to produce executable file or computer instructions that perform various functions of the present invention. In another embodiment, program logic 150 may be distributed among more than one of server 102, computers 120, 122 and 130, or any combination of the above.

Note that although server 102 is shown as a single and independent entity, in one embodiment of the present invention, the functions of server 102 may be integrated with another entity, such as one of the client computers or payment authority 145. Further, server 102 and its functionality, according to a preferred embodiment of the present invention, can be realized in a centralized fashion in one computer system or in a distributed fashion wherein different elements are spread across several interconnected computer systems.

The network architecture of FIG. 1 in accordance with the principles of the present invention may give rise to various revenue-generating arrangements. The users 110, 112 may, for example, sale and/or purchase products or services via the present invention and recruit others to do the same. The users 110, 112 may also, for example, pay an ongoing or per-transaction fee to the operators of server 102 in exchange for the services provided by server 102.

FIG. 1 also shows a payment authority 145 to effectuate payments by salesman 110 and/or recruit/customer 112 for products, services or the like. In the course of a sales transaction, the program logic 150 may interface with payment authority 145 to effectuate payment. In one embodiment of the present invention, the payment authority 145 is a payment gateway, which is an e-commerce Application Service Provider (ASP) service that authorizes payments for individuals, e-businesses, online retailers, or traditional brick and mortar businesses. The payment authority 145 may accept payment via the use of credit cards, charge cards, bank cards, gift cards, account cards, etc.

Figure 2:
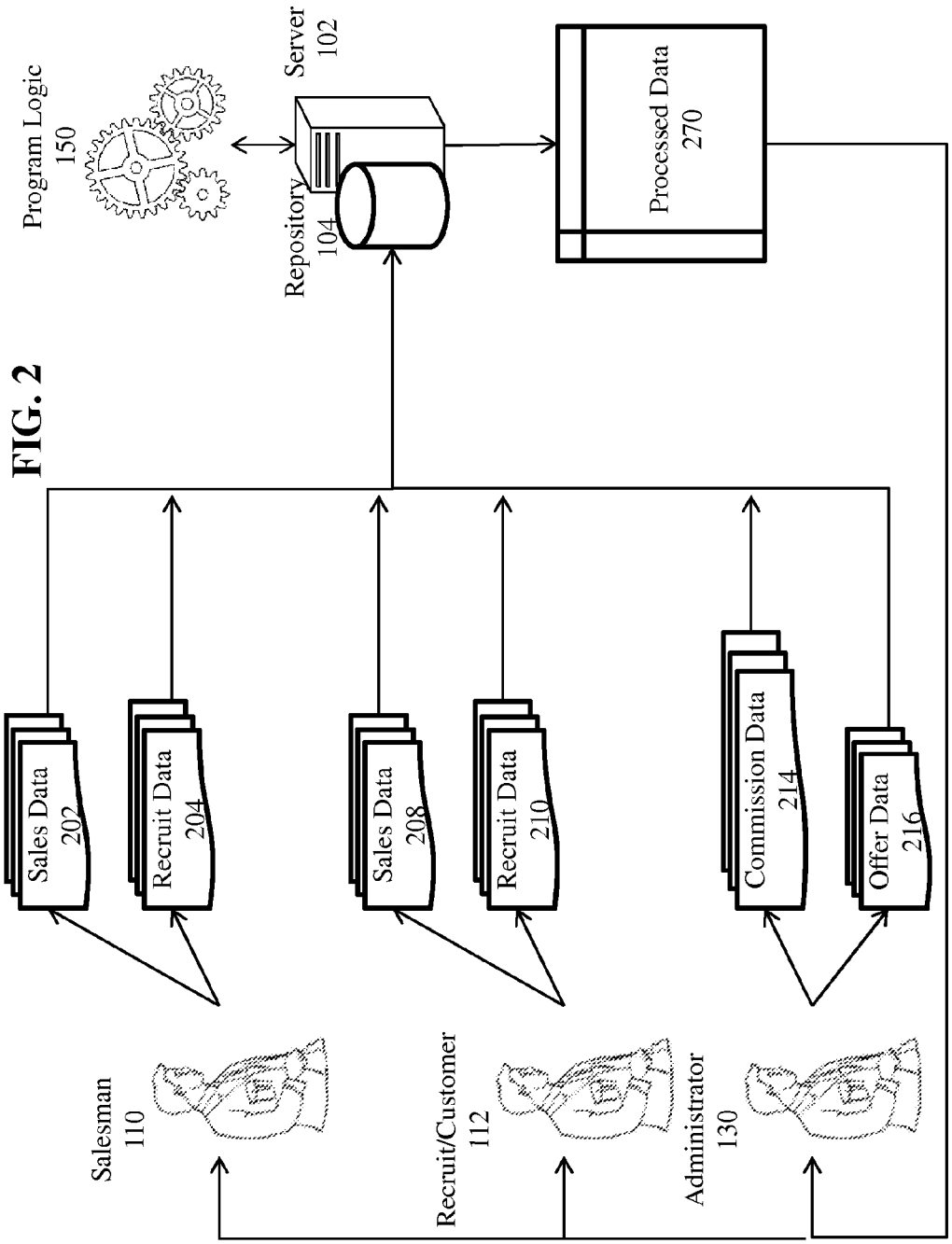
FIG. 2 is a block diagram showing the various data that is entered, stored, processed and managed according to one embodiment of the present invention.

FIG. 2 is a block diagram showing the various data that is entered, stored, processed and managed according to one embodiment of the present invention. FIG. 2 shows that salesman 110 may enter various data sets into repository 104 for processing and management by program logic 150 on server 102. Salesman 110 may enter sales transaction data 202, which pertains to sales of products effectuated by the salesman 110. Salesman 110 may also enter recruitment activity data 204, which pertains to recruitment of others to participate in the sales force.

Data sets 202, 204 may be entered into repository 104 by the salesman 110 via its client computer 120, using a mobile app or a similar means. A mobile app is a software application, usually designed to run on smart-phones and tablet computers. Note that data sets 202, 204 entered into repository 104 are associated with the user record for salesman 110. To the extent that certain information within data sets 202, 204 is associated with another user, such as recruitment activity data being associated with recruit 112, the aforementioned data may also be associated with the user record for recruit 112.

FIG. 2 also shows that recruit 112 may enter various data sets into repository 104 for processing and management by program logic 150 on server 102. Recruit 112 may enter sales transaction data 208, which pertains to sales of products effectuated by the recruit 112, and recruitment activity data 210, which pertains to recruitment of others to participate in the sales force.

Data sets 208, 210 may be entered into repository 104 by the recruit 112 via its client computer 122, and data sets 208, 210 are associated with the user record for recruit 112. To the extent that certain information within data sets 208, 210 is associated with another user, such as any sales, which are inherently related to salesman 110 (since salesman 110 recruited recruit 112), the aforementioned data may also be associated with the user record for salesman 110.

FIG. 2 further shows that administrator 130 may enter various data sets into repository 104 for processing and management by program logic 150 on server 102. Administrator 130 may enter commission data 214 or sales award milestone data pertaining to one or more users. Administrator 130 may also enter offer data 216, which may comprise a coupon, a discount, a group buying offer, a discount offer, a deal of the day or the like. Data sets 214 and 216 may be entered into repository 104 by the administrator 130 via its client computer 132. Note that data sets 214 and 216 entered into repository 104 are associated with the user record to which the data pertains.

The data sets entered by the various parties may be processed by program logic 150 on server 102 and presented for viewing to administrator 130, salesman 110 and recruit 112 as processed data 270 via network 106. Specifically, processed data 270 may be sent to the computers 132, 120, 122 of the entities 130, 110, 112, respectively, via the communications network 106.

In one embodiment, the processed data 270 includes commission information for each salesman 110, recruit or customer 112. The commission information may include the past, current or future amount of commission(s) earned by each salesman/recruit/customer according to the formula for calculating a commission, which resides in the data 214 entered by the administrator 130. The formula for calculating a commission may comprise, for example, a certain percentage of gross or net sales of an individual and a certain percentage of gross or net sales of an individual's recruits. The formula for calculating a commission may also take other data into account, such as volume of sales, speed of sales, etc. Processed data 270 may further be processed using any statistical technique to aid interpretation of data. Program logic 150 may also provide for differing views of the processed data 270. In another embodiment of the present invention, processed data 270 comprises a discount offer or group buying offer, which is disseminated to the salesman 110 and/or customers 112, as described in greater detail below with respect to FIG. 3.

Figure 3:
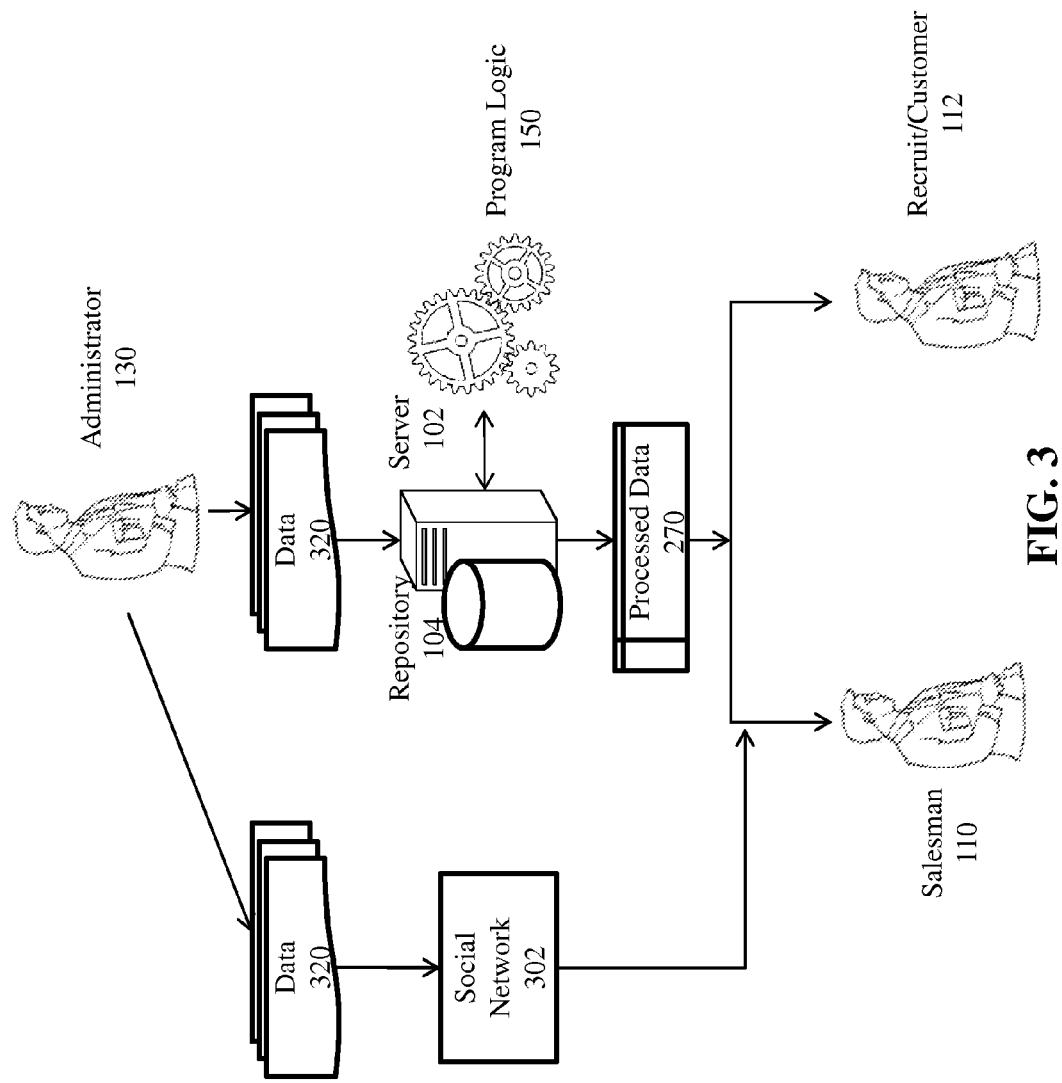
FIG. 3 is a block diagram showing advertising and promotion methods, including discount offers, according to one embodiment of the present invention.

FIG. 3 is a block diagram showing advertising and promotion methods, including discount offers, according to one embodiment of the present invention. The block diagram of FIG. 3 illustrates the process of advanced methods of issuing promotions and ads in a direct sales environment.

FIG. 3 describes a process wherein administrator 130 a discount offer or group buying offer and the server 102 disseminates it to computer 120 of salesman 110 and computer 122 of recruit or customer 112 via push technology over the communications network 106. Push technology, or server push, describes a style of Internet-based communication where the ad or promotion, created by administrator 130, is transmitted by the server 102 to clients. Push technology is contrasted with pull technology, where the request for the transmission of information is initiated by the receiver or client. Examples of push technology include HTTP server push, a pushlet, long polling and Flash XMLSocket relays. Note the present invention also supports offers being generated by salesman 110 or customer 112 and pushed to others.

FIG. 3 shows that in one embodiment, administrator 130 generates an offer, such as a discount offer or a group buying offer, as defined above, encapsulated in data packet 320, and sends it to the server 102. The data packet 320 may also include target data pertaining to the target for the offer, such as a geographical location, a region, a time period, demographic data describing individuals to which the offer is directed (age range, gender, marital status, income level, etc.) and/or specific names or address of the individuals to which the offer is directed.

The generated data packet 320 is then provided to server 102, wherein logic 150 of server 102 processes the data packet and determines how to implement it. For example, the logic 150 of server 102 may determine to whom the corresponding offer is transmitted, based on the target data specified in the data packet 320. The program logic 150 may accomplish the step of determining to whom the offer shall be transmitted by searching the profiles of users in database 104 for those profiles with data that matches the target data. In another example, the logic 150 of server 102 determines when and for how long the offer is valid, based on information specified in the data packet 320.

Once processed, the server 102 transmits the corresponding offer, as processed data 270, to the intended recipients, such as users 110 and 112, via push technology at the specified time. Specifically, server 102 transmits the offer, as processed data 270, to the mobile computers 120 and 122 of the users 110 and 112, respectively. In one embodiment, the server 102 transmits offers specified in the data packet 320 based on a location based service. A location based service is an information or entertainment service, accessible with mobile devices through the mobile network and utilizing the ability to make use of the geographical position of the mobile device. In this embodiment, the corresponding data packet 320 may specify that an offer shall be transmitted solely to users that are located within a specified geographical area. Consequently, the server 102 transmits the offer of the data packet 320, as processed data 270, based on the location of the users 110 and 112, as provided by the location based service.

In one embodiment, the generated data packet 320 is provided to a third party social network 302 via the web 106, which processes the data packet and determines how to implement it, similar to the implementation of server 102. Once processed, the social network 302 transmits the corresponding offer to the intended recipients, such as users 110 and 112. Specifically, the social network 302 transmits the offer to the mobile computers 120 and 122 of the users 110 and 112. In yet another embodiment, the third party social network 302 transmits offers specified in the data packet 320 based on a location based service.

Consequently, users, such as users 110, 112, may accept the offer of the data packet 320, which may be a discount offer or a group buying offer. The process for accepting discount offers and effectuating a sales transaction is described in greater detail below with reference to FIG. 4A.

Figure 4A:
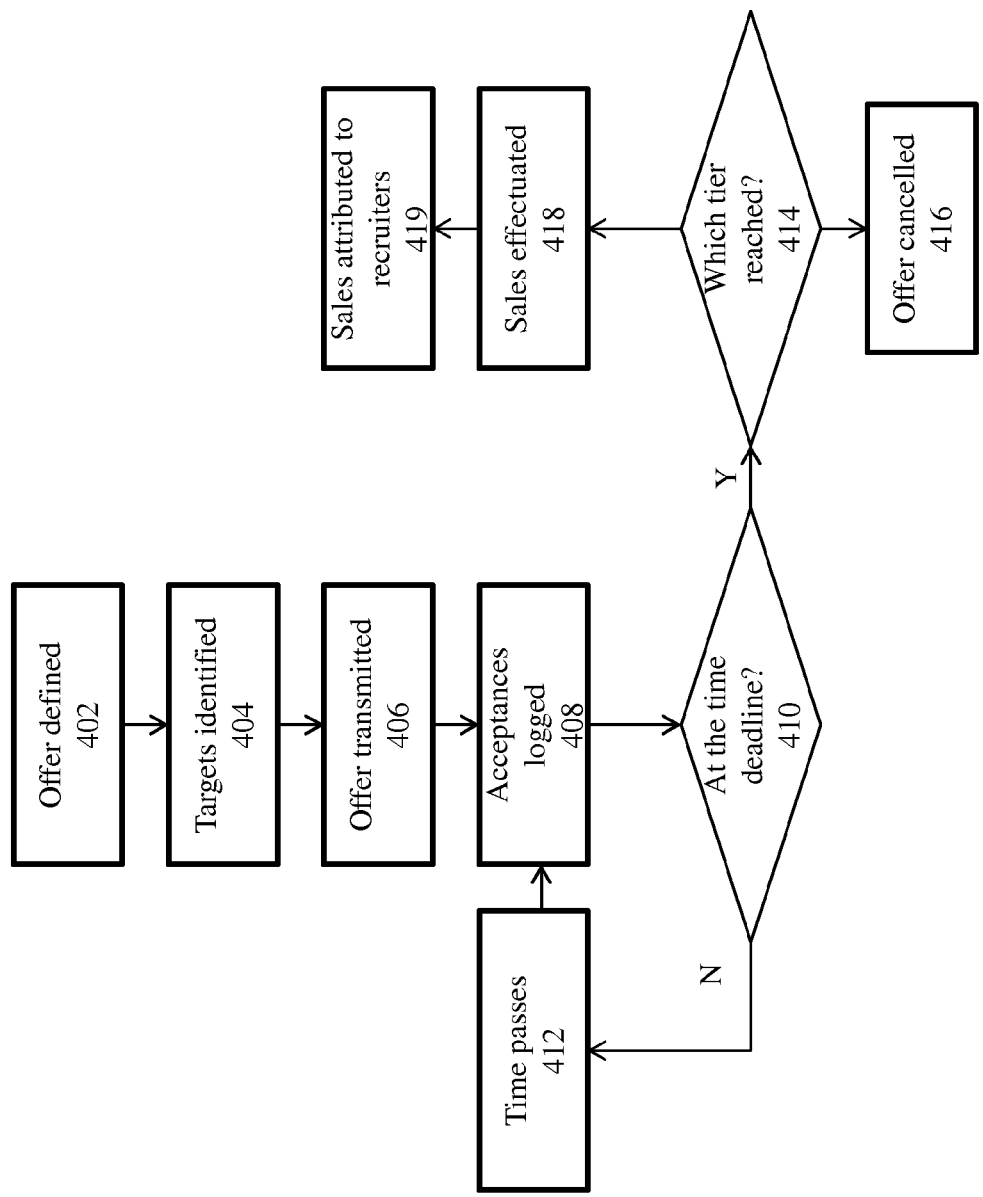
FIG. 4A is a flow chart depicting the general control flow of a discount buying process, according to one embodiment of the present invention.

FIG. 4A is a flow chart depicting the general control flow of a discount buying process, according to one embodiment of the present invention. In step 402, administrator 130 defines a discount offer or group buying offer, as defined above. The discount offer or group buying offer may further comprise a tiered discount system wherein a first number of acceptances triggers a first discount price lower than an initial price of the product or service, a second (higher) number of acceptances triggers a second (lower) discount price, a third (even higher) number of acceptances triggers a third (even lower) discount price, etc. In yet another embodiment, a discount offer or group buying offer may be associated with target data, such as demographic information, that defines the targets of the offer.

In step 404, the program logic 150 of server 102 receives the discount offer or group buying offer and determines to whom it shall be sent depending on the target data associated with the offer. In one embodiment, the mobile computers 120, 122 of the users send current location data to the server 102. The server 102 utilizes the location data of the users, as well as any other information associated with a user's record in the database 104, to determine whether, and to whom, the offer shall be transmitted. In step 406, the server 102 transmits the offer, as processed data 270, to the mobile computers of the users via the network 106.

In step 408, acceptances of the discount offer or group buying offer from each consumer are logged and stored. An acceptance may be effectuated by a customer when he interacts with his computer 122. The customer may, for example, press a "purchase" button in a mobile application executing on his computer 122. An acceptance may also include the individual entering electronic payment information. Alternatively, a customer's electronic payment information may already be stored in association with his user record in database 104, in which case the customer may press a "purchase" button in a mobile application executing on his computer 122, and subsequently, program logic 150 of server 102 accesses his electronic payment information from the database 104.

In step 410, it is determined whether the time deadline of the offer has been reached. If so, then control flows to step 414. If the time deadline of the offer has not been reached, then control flows to step 412 where additional time passes and additional consumers are provided with the opportunity to accept the offer in step 408, thereby adding to the current number of acceptances of the discount offer. Control flows back to step 410 after step 408.

In an embodiment wherein the discount offer comprises a single tier with only one discount price at a minimum number of acceptances, in step 414, the program logic 150 of server 102 determines whether the discount price has been reached, according to the minimum number of acceptances for that discount offer. If the discount price has been reached, then in step 418, program logic 150 of server 102 effectuates sales of the product or service at the discount price of the discount offer. If the discount price has not been reached, then in step 418, program logic 150 of server 102 effectuates sales of the product or service at the initial price of the discount offer.

In an embodiment wherein the discount offer comprises a multiple tiered discount offer, such as that shown in FIG. 5, in step 414, the program logic 150 of server 102 determines which tier, if any, has been met by the current number of acceptances. Recall that a first number of acceptances triggers a first discount price lower than the initial price, a second (higher) number of acceptances triggers a second (lower) discount price, a third (even higher) number of acceptances triggers a third (even lower) discount price, etc. If any tier has been reached, according to the current number of acceptances, in step 418, program logic 150 of server 102 effectuates a sale of the product or service at the current discount price corresponding to the number of acceptances of the multiple tiered discount offer (see FIG. 5). If no tier has been reached, in step 418, program logic 150 of server 102 effectuates a sale of the product or service at the initial price of the discount offer.

In one embodiment of the present invention, if, in step 414, it is determined that no minimum number of acceptances has been reached, that no tier of the multiple tiered discount offer has been reached, and/or no acceptances have been reached, then control flows to step 416, wherein the discount offer is cancelled and all of the accepting users (if any) are notified of the cancellation.

In step 419, the program logic 150 of server 102 determines the recruiter, if any, of each of the accepting users, so as to attribute the sale of the product or service to the recruiter. The program logic 150 of server 102 then stores the sales transaction data of each sale in association with the user record for the recruiter responsible for the consumer that made the purchase. This information may later be used to calculate and effectuate the payment of a commission to the recruiter.

Figure 4B:
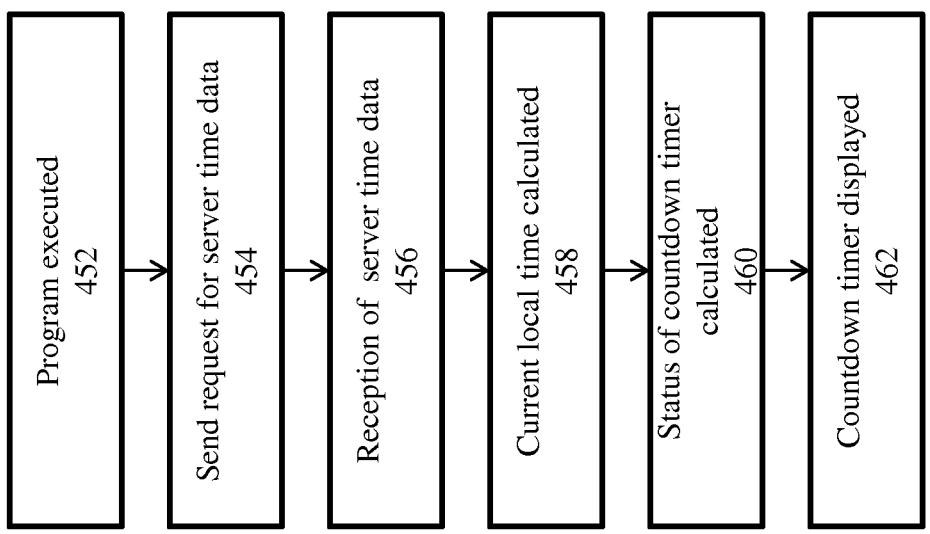
FIG. 4B is a flow chart depicting the control flow of the countdown timer process, according to one embodiment of the present invention.

FIG. 4B is a flow chart depicting a control flow of a countdown timer process, according to one embodiment of the present invention. Recall from above that a discount offer or group buying offer may comprise, among other things, computer program code that comprises a countdown timer that counts down to the time at which the offer expires, i.e., the time deadline for the discount offer). Also recall from FIG. 3 that salesman 110 and/or customers 112 received processed data 270 from server 102, wherein the processed data 270 may comprise a discount offer or group buying offer.

It is assumed before the execution of the steps of FIG. 4B that at least a portion of the program logic 150 resides on a client computer, such as mobile phone 120. The mobile phone 120 may have received program logic 150 within the processed data 270 that was disseminated, as described in FIG. 3 above. In this example, program logic 150 comprises an app, mobile app, mobile application or software application, designed to run on smartphones and tablet computers.

In step 452 program logic 150 is executed. This step may have occurred when the program logic 150 was initially received or on subsequent occasions when the user 110 of mobile phone 120 re-initializes or runs the program logic 150.

In step 454, program logic 150 sends, via network 106, a request for server time data to server 102. Recall that the discount offer or group buying offer, including the time deadline of the offer, may be stored in database 104. In step 454, the program logic 150 sends a request to server 102 for server time data, which may include, among other things, the current local time of server 102, the time zone of server 102, the remaining amount of time between the current local time of server 102 and the time deadline of the group buying offer, which is provided in terms of the local time of server 102.

In step 456, the server 102 sends, via network 106, the requested server time data to mobile phone 120 and the program logic 150 of mobile phone 120 receives the aforementioned requested data. In step 458, the program logic 150 of mobile phone 120 calculates the current local time of mobile phone 120. There are various well-known methods of calculating current local time by a mobile phone or tablet computer, which include processes such as keeping and maintaining local time on the mobile phone or tablet computer, accessing network time data from a cellular network or other data provider, and performing mathematical operations to account for any difference in time zone between the cellular network or other data provider and the mobile phone or tablet computer.

In step 460, the program logic 150 of mobile phone 120 calculates the current status of the countdown timer using the data received in step 456 and the current local time of mobile phone 120, which was calculated in step 458. The current status of the countdown timer may refer to the current amount of absolute time remaining until the time deadline of the group buying offer. For example, if there are two hours and three minutes remaining until the time deadline of the group buying offer, the current status of the countdown timer would be a time value of 02:03:00.

In one embodiment, the step of calculating the current status of the countdown timer may comprise calculating the time difference (attributed to time zone differences) between the current local time of mobile phone 120 and the current local time of server 102, adjusting the time deadline of the group buying offer according to the calculated time difference (such that the time deadline of the group buying offer is provided in terms of local time at phone 120), and calculating an amount of time remaining at the local time zone of mobile phone 120 by subtracting the adjusted time deadline of the group buying offer from the current local time of mobile phone 120. For example, assume server 102 has a local time of 8 am, phone 120 has a local time of 11 am and the time deadline of the discount offer is 12 pm (for local time at server 102). The step of calculating the current status of the countdown timer, may comprise calculating a 3-hour time zone difference between phone 120 and server 102, determining a time deadline of 3 pm (for local time at phone 120) and determining a remaining time of 4 hours.

In yet another embodiment, the step of calculating the current status of the countdown timer may comprise reading the following data received from server 102: the remaining amount of time between the current local time of server 102 and the time deadline of the group buying offer. In step 462, the countdown timer displays the current remaining amount of time until the time deadline of the group buying offer, based on the data calculated in step 460. The display of time may occur in terms of days, months, weeks, hours, minutes and seconds, or any combination of the above. Step 462 may further comprise continuous execution of a timer function wherein the remaining time initially displayed in step 462 is continually depleted in increments of seconds.

Figure 4C:
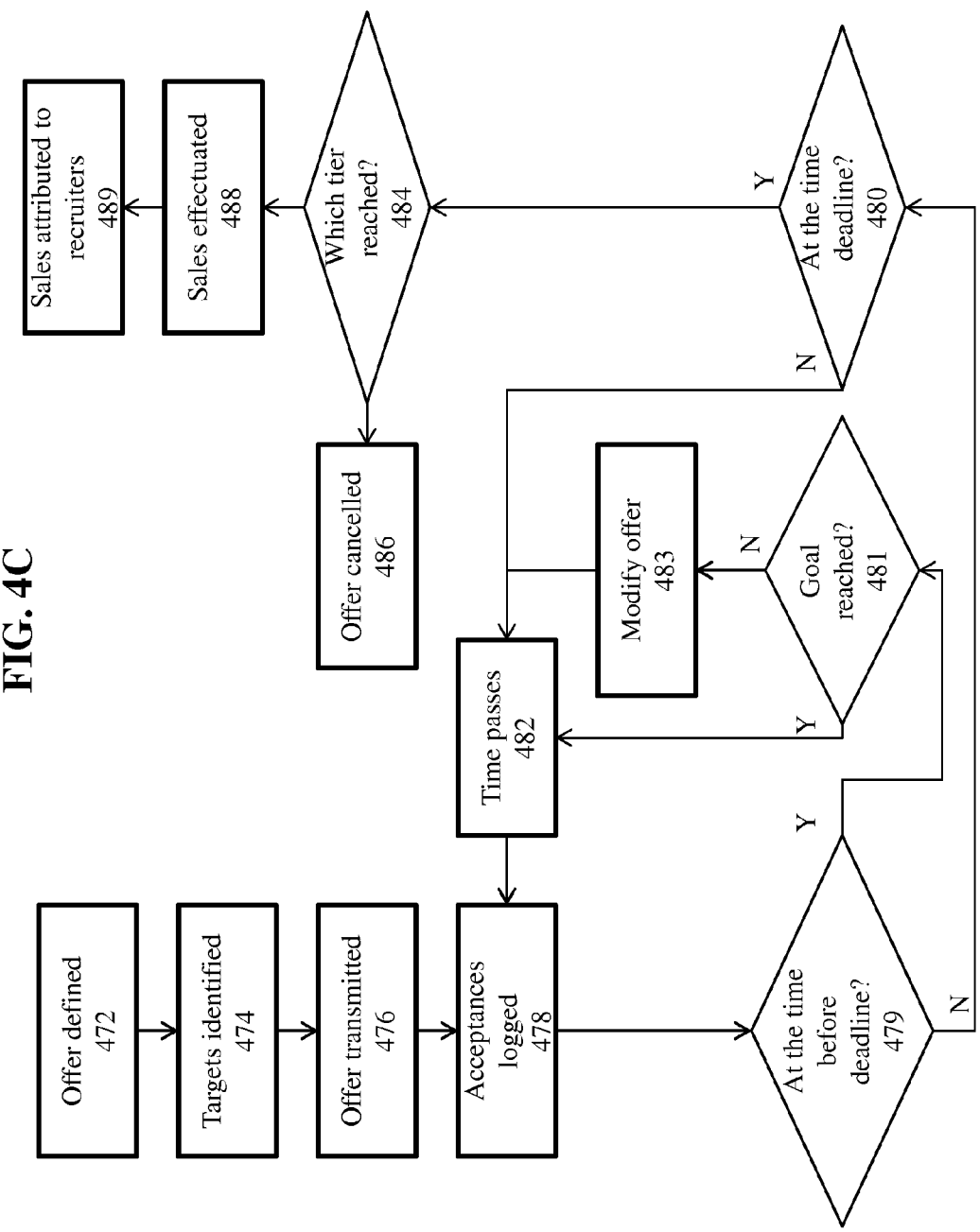
FIG. 4C is a flow chart depicting the control flow of the dynamic discount offer or group buying offer process, according to one embodiment of the present invention.

FIG. 4C is a flow chart depicting the control flow of the dynamic discount offer or group buying offer process, according to one embodiment of the present invention. In step 472, similar to step 402 of FIG. 4A above, administrator 130 defines a discount offer or group buying offer, as defined above. In step 474, similar to step 404 above, the program logic 150 of server 102 receives the discount offer or group buying offer and determines to whom it shall be sent depending on the target data associated with the offer. In step 476, similar to step 406, the server 102 transmits the offer, as processed data 270, to the mobile computers of the users via the network 106. In step 478, similar to step 408, acceptances of the discount offer or group buying offer from each consumer are logged and stored by the program logic 150 of server 102.

In step 479, the program logic 150 of server 102 determines whether a pre-defined time before the time deadline of the discount offer has been reached. The pre-defined time before the time deadline may be calculated as a pre-set number of days, hours, minutes and/or seconds (from zero to infinity) before the time deadline of the discount offer. If the pre-defined time before the time deadline of the discount offer has been reached, then control flows to step 481. If the pre-defined time before the time deadline of the discount offer has not been reached, then control flows to step 480 where the program logic 150 of server 102 determines whether the time deadline of the offer has been reached. If so, then control flows to step 484. If the time deadline of the offer has not been reached, then control flows to step 482 where additional time passes and additional consumers are provided with the opportunity to accept the offer in step 478, thereby adding to the current number of acceptances of the discount offer. Control flows back to step 479 after step 478.

In step 481 the program logic 150 of server 102 determines whether a pre-defined goal of the discount offer or group buying offer has been reached. The pre-defined goal may be one or more of any metrics surrounding a discount offer or group buying offer. For example, a pre-defined goal may be one or more of the following: (i) a defined current number of acceptances of the discount offer, (ii) a current number of acceptances of the discount offer that corresponds to a defined percentage of the minimum number of acceptances of the offer that are required to trigger the first, second or "n" discount price of a multi-tiered discount offer or group buying offer, (iii) attainment of the first, second, or "n" tier of a multi-tiered discount offer or group buying offer as per the current number of acceptances, or (iv) a defined current number of acceptances of the discount offer, wherein a set number of acceptances were received within a predefined period of time.

If the pre-defined goal has been reached, then control flows to step 482 where additional time passes and additional consumers are provided with the opportunity to accept the offer in step 478, thereby adding to the current number of acceptances of the discount offer. If the pre-defined goal has not been reached, then control flows to step 483.

In step 483, the discount offer or group buying offer is modified or adjusted in order to induce or encourage more consumers to accept the discount offer and/or to allow more time for additional consumers are to accept the discount offer.

Subsequently, control flows to step 482. The discount offer or group buying offer may modified or adjusted in step 483 according to one or more of the following: i) increasing the time deadline of the discount offer by a pre-determined increment of time, ii) decreasing, by a predetermined numerical decrement, the minimum number of acceptances required to trigger the discount price, iii) decreasing, by a predetermined numerical decrement, the first, second, or "n" minimum number of acceptances required to trigger the first, second, or "n" discount prices, respectively, iv) decreasing, by a predetermined monetary decrement, the discount price, the first discount price, the second discount price or "n" discount price, and v) increasing, by a predetermined numerical increment, the number of products or services that will be purchased at the discount price of the discount offer. In one alternative, in lieu of increasing the number of products or services that will be purchased at the discount price, the discount offer may be modified so as to add a different product or benefit to the products or services that will be purchased. This alternative may include adding other products, coupons or passes for entry to special events.

In one embodiment of the present invention, the discount offer or group buying offer is modified or adjusted by variable or dynamic increments or decrements that correspond to other data. For example, the discount offer or group buying offer may modified or adjusted according to one or more of the following: i) increasing the time deadline of the discount offer by an increment of time that corresponds proportionally to the remaining number of acceptances necessary to attain a discount price, ii) decreasing the minimum number of acceptances required to trigger the discount price by a numerical decrement that corresponds proportionally to the remaining number of acceptances necessary to attain a discount price, iii) decreasing the first, second, or "n" minimum number of acceptances required to trigger the first, second, or "n" discount prices, respectively, by a numerical decrement that corresponds proportionally to the remaining number of acceptances necessary to attain a discount price, iv) decreasing the discount price, the first discount price, the second discount price or "n" discount price by a monetary decrement that corresponds proportionally to the remaining number of acceptances necessary to attain a discount price, v) increasing the number of products or services that will be purchased at the price of the discount offer, by a predetermined numerical increment that corresponds proportionally to the remaining number of acceptances necessary to attain a discount price.

Returning to the flow chart of FIG. 4C, in an embodiment wherein the discount offer comprises a single tier with only one discount price at a minimum number of acceptances, in step 484, like step 414, the program logic 150 of server 102 determines whether the discount price has been reached, according to the minimum number of acceptances for that discount offer. If the discount price has been reached, then in step 488, like step 418, program logic 150 of server 102 effectuates sales of the product or service at the discount price of the discount offer. If the discount price has not been reached, then in step 488, program logic 150 of server 102 effectuates sales of the product or service at the initial price of the discount offer.

In an embodiment wherein the discount offer comprises a multiple tiered discount offer, such as that shown in FIG. 5, in step 484, the program logic 150 of server 102 determines which tier, if any, has been met by the current number of acceptances. If any tier has been reached, according to the current number of acceptances, in step 488, program logic 150 of server 102 effectuates a sale of the product or service at the current discount price corresponding to the number of acceptances of the multiple tiered discount offer (see FIG. 5). If no tier has been reached, in step 488, program logic 150 of server 102 effectuates a sale of the product or service at the initial price of the discount offer.

In one embodiment of the present invention, if, in step 484, it is determined that no minimum number of acceptances has been reached, that no tier of the multiple tiered discount offer has been reached, and/or no acceptances have been reached, then control flows to step 486, wherein the discount offer is cancelled and all of the accepting users (if any) are notified of the cancellation.

In step 489, like step 419, the program logic 150 of server 102 determines the recruiter, if any, of each of the accepting users, so as to attribute the sale of the product or service to the recruiter. The program logic 150 of server 102 then stores the sales transaction data of each sale in association with the user record for the recruiter responsible for the consumer that made the purchase.

It should be noted that FIG. 4C describes the process by which the tiers of discount offers or group buying offers are automatically adjusted by program logic 150 of server 102. In one embodiment, administrator 130 may, using a graphical user interface, perform the actions executed by the program logic 150 of server 102 in the process of FIG. 4C. Specifically, the administrator 130 may utilize his computer 132 and interact with a graphical user interface to modify any aspect of the discount offer, such as the modifications defined with regard to step 483, at any time during the pendency of a discount offer.

Figure 4D:
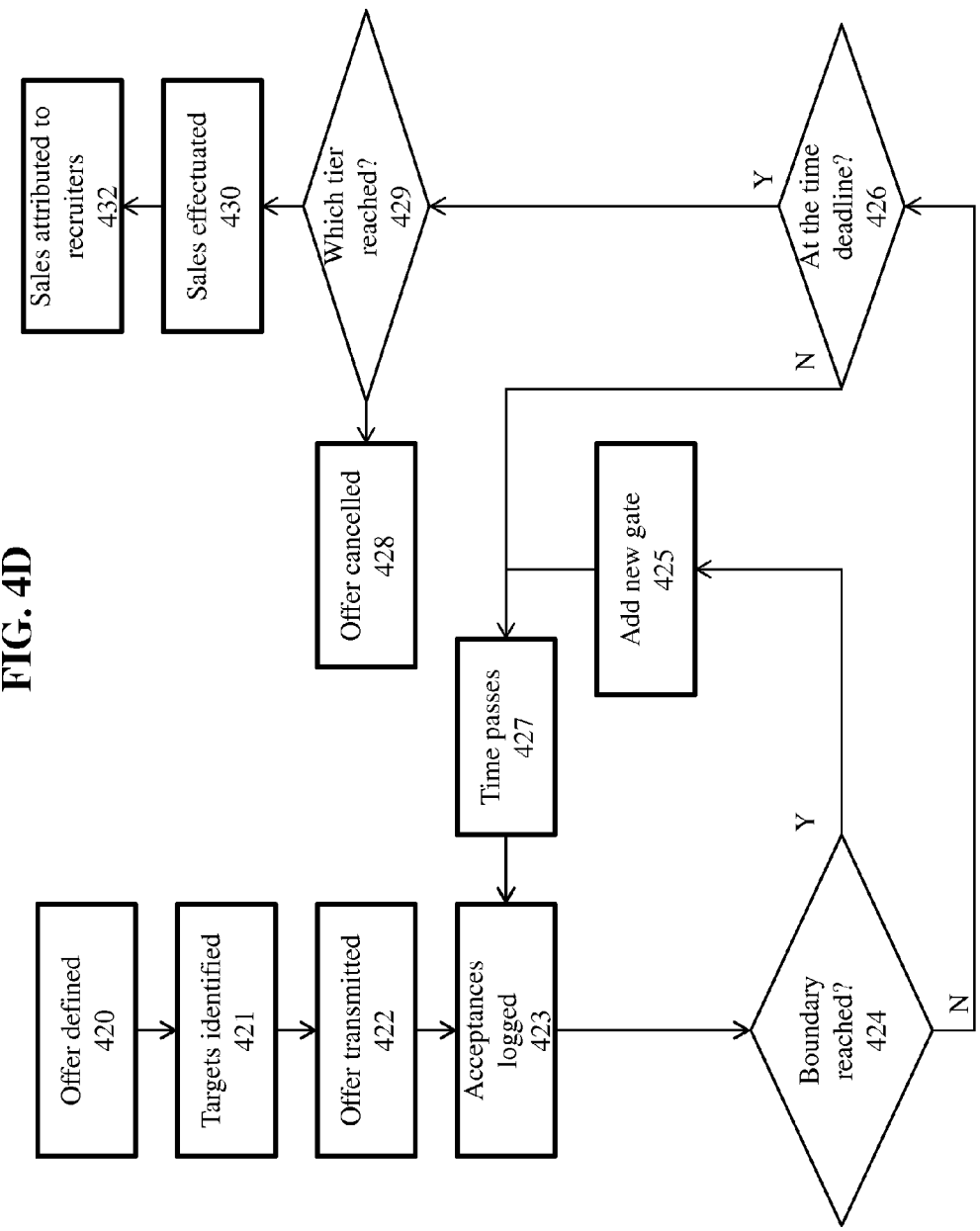
FIG. 4D is a flow chart depicting the control flow of an alternative dynamic discount offer or group buying offer process, according to one embodiment of the present invention.

FIG. 4D is a flow chart depicting the control flow of an alternative dynamic discount offer or group buying offer process, according to one embodiment of the present invention. In step 420, similar to step 472 of FIG. 4C above, administrator 130 defines a discount offer or group buying offer. In step 421, similar to step 474 above, the program logic 150 of server 102 receives the discount offer or group buying offer and determines to whom it shall be sent depending on the target data associated with the offer. In step 422, similar to step 476, the server 102 transmits the offer, as processed data 270, to the mobile computers of the users via the network 106. In step 423, similar to step 478, acceptances of the discount offer or group buying offer from each consumer are logged and stored by the program logic 150 of server 102.

In step 424, the program logic 150 of server 102 determines whether a pre-defined boundary has been reached. A pre-defined boundary has been reached if the current number of acceptances equals or exceeds the predefined boundary value. If a pre-defined boundary of the discount offer has been reached, then control flows to step 425. If a pre-defined boundary has not been reached, then control flows to step 426 where the program logic 150 of server 102 determines whether the time deadline of the offer has been reached. If so, then control flows to step 429. If the time deadline of the offer has not been reached, then control flows to step 427 where additional time passes and additional consumers are provided with the opportunity to accept the offer in step 423, thereby adding to the current number of acceptances of the discount offer. Control flows back to step 424 after step 423.

In step 425, the discount offer or group buying offer is modified or adjusted in order to induce or encourage more consumers to accept the discount offer and/or to increase the volume of acceptances of the discount offer. The discount offer or group buying offer may be modified or adjusted in step 425 in the following way: an additional tier, including a minimum number of acceptances and a per unit price for the product or service, is added to the tiered discount offer.

In one embodiment of the present invention, the definition of the additional tier added to the discount offer or group buying offer in step 425 may correspond to other data. For example, the additional tier added to the discount offer or group buying offer may correspond to one or more of the following: i) the number of acceptances over the last minimum number of acceptances that was obtained, ii) the amount of time in which the minimum number of acceptances was obtained, and iii) the speed at which the minimum number of acceptances was obtained.

Returning to the flow chart of FIG. 4D, in an embodiment wherein the discount offer comprises a single tier with only one discount price at a minimum number of acceptances (and no additional tiers have been added via step 425), in step 429, like step 484, the program logic 150 of server 102 determines whether the discount price has been reached, according to the minimum number of acceptances for that discount offer. If the discount price has been reached, then in step 430, like step 488, program logic 150 of server 102 effectuates sales of the product or service at the discount price of the discount offer. If the discount price has not been reached, then in step 430 program logic 150 of server 102 effectuates sales of the product or service at the initial price of the discount offer.

In an embodiment wherein the discount offer comprises a multiple tiered discount offer, such as that shown in FIG. 5, in step 429, the program logic 150 of server 102 determines which tier, if any, has been met by the current number of acceptances. If any tier has been reached, according to the current number of acceptances, in step 430, program logic 150 of server 102 effectuates a sale of the product or service at the current discount price corresponding to the number of acceptances of the multiple tiered discount offer (see FIG. 5). If no tier has been reached, in step 430, program logic 150 of server 102 effectuates a sale of the product or service at the initial price of the discount offer.

In one embodiment of the present invention, if, in step 429, it is determined that no minimum number of acceptances has been reached, that no tier of the multiple tiered discount offer has been reached, and/or no acceptances have been reached, then control flows to step 428, wherein the discount offer is cancelled and all of the accepting users (if any) are notified of the cancellation.

In step 432, like step 489, the program logic 150 of server 102 determines the recruiter, if any, of each of the accepting users, so as to attribute the sale of the product or service to the recruiter. The program logic 150 of server 102 then stores the sales transaction data of each sale in association with the user record for the recruiter responsible for the consumer that made the purchase.

It should be noted that FIG. 4D describes the process by which tiers are automatically added to discount offers or group buying offers by program logic 150 of server 102. In one embodiment, administrator 130 may, using a graphical user interface, perform the actions executed by the program logic 150 of server 102 in the process of FIG. 4D. Specifically, the administrator 130 may utilize his computer 132 and interact with a graphical user interface to modify any aspect of the discount offer, such as the modifications defined with regard to step 425, at any time during the pendency of a discount offer.

Figure 6:
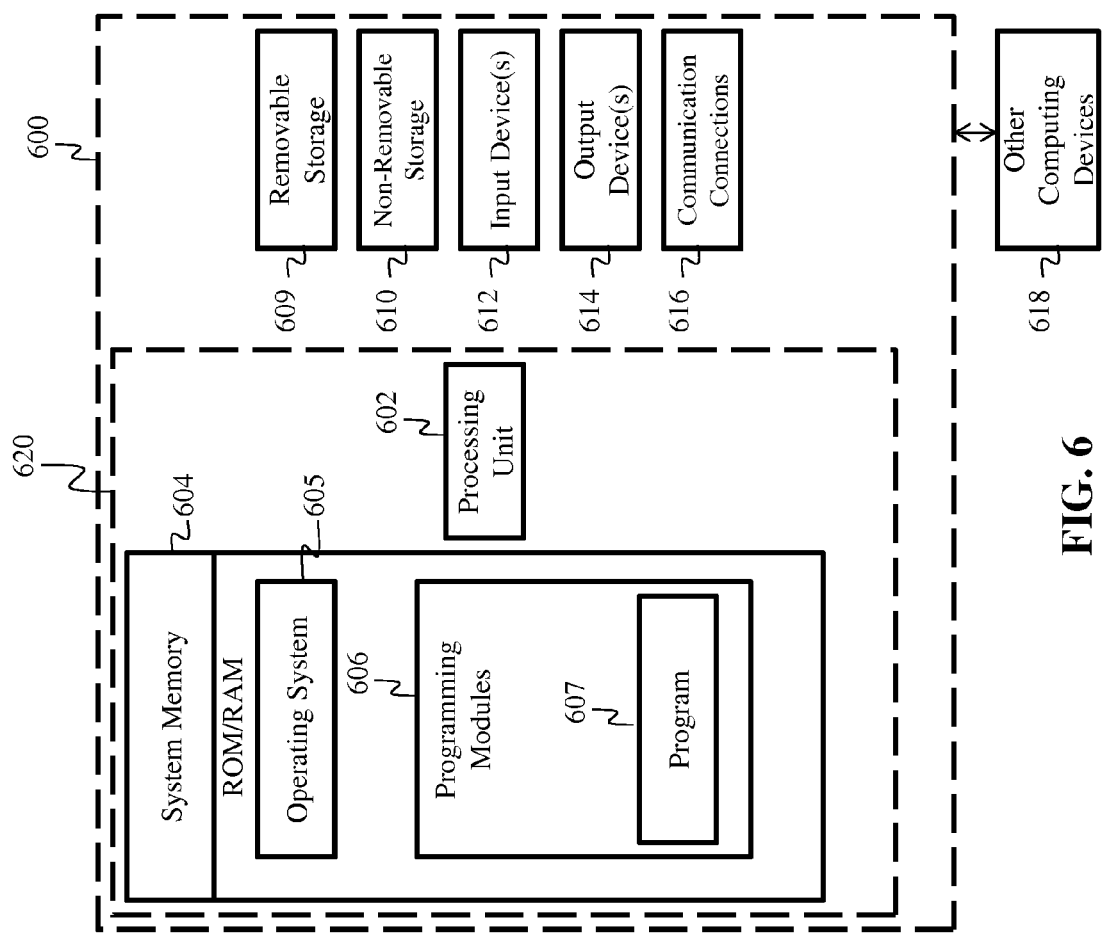
FIG. 6 is a block diagram of a system including an example computing device and other computing devices.

FIG. 6 is a block diagram of a system including an example computing device 600 and other computing devices. Consistent with the embodiments described herein, the aforementioned actions performed by 102, 120, 122, and 130 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for the methods shown in FIGS. 2-4D above.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, one or more programming modules 606. Operating system 605, for example, may be suitable for controlling computing device 600's operation. In one embodiment, programming modules 606 may include, for example, a program module 607. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 may perform processes including, for example, one or more of the methods shown in FIGS. 2-4D above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a server for managing discount offers for a plurality of users over a communications network, comprising: receiving, from mobile computers communicatively coupled with the communications network, enrollment data of the plurality of users, wherein enrollment data includes at least contact information of the users; receiving, via the communications network, a discount offer, wherein the discount offer comprises at least a product or service description, an initial price, a discount price less than the initial price, a minimum number of acceptances of the discount offer that are required to trigger the discount price and a time deadline for the discount offer; transmitting, via the communications network, computer program code and the discount offer only to the mobile computers of the users that have provided enrollment data to the server, wherein the computer program code comprises a countdown timer that counts down to the time deadline for the discount offer; receiving, via the communications network, acceptances of the discount offer from the mobile computers of the users; detecting attainment of a predefined time before the time deadline; and responsive to detecting attainment of the predefined time before the time deadline, executing the following steps at the predefined time before the time deadline: calculating a number of acceptances of the discount offer at the predefined time before the time deadline, wherein the number of acceptances is calculated to be less than the minimum number of acceptances of the discount offer; decreasing the minimum number of acceptances by a predetermined numerical decrement; increasing the time deadline by an increment of time; and re-transmitting, via the communications network, the discount offer with the decreased minimum number of acceptances and the increased time deadline only to the mobile computers of the plurality of users that provided enrollment data to the server.

2. The method of claim 1, further comprising:
decreasing the discount price by a monetary decrement; and
re-transmitting the discount offer with a decreased discount price only to the mobile computers of the plurality of users that have provided enrollment data to the server.

3. The method of claim 1, further comprising:
increasing the number or amount of products or services by an increment of time; and
re-transmitting the discount offer with an increased number or amount of products or services only to the mobile computers of the plurality of users that have provided enrollment data to the server.

4. The method of claim 1, further comprising:
detecting passage of a predefined period of time;
detecting attainment of the time deadline;
calculating a number of acceptances of the discount offer, wherein the number of acceptances is calculated to be greater than or equal to the minimum number of acceptances of the discount offer; and
effectuating a sale of the product or service of the discount offer at the discount price to each user that accepted the discount offer.

5. The method of claim 4, further comprising:
attributing at least one sale of the product or service to a first user who entered enrollment data into the server for a buyer of the at least one sale, so as to award a commission to the first user.

6. The method of claim 4, further comprising:
transmitting a current number of acceptances of the discount offer only to the mobile computers of the plurality of users that have provided enrollment data to the server, via the communications network.

7. The method of claim 4, wherein the step of transmitting the discount offer further comprises:
transmitting computer program code only to the mobile computers of the plurality of users that have provided enrollment data to the server, together with the discount offer, wherein the computer program code comprises a countdown timer that counts down to the time deadline and displays a current number of acceptances of the discount offer.

8. The method of claim 7, further comprising:
receiving a request, via the communications network, from the computer program code in a first mobile computer of the plurality of users, for local time at the server; and
transmitting a message, via the communications network, to the first mobile computer, wherein the message includes the local time at the server.

9. A method on a server for managing discount offers for a plurality of users over a communications network, comprising: receiving, from mobile computers communicatively coupled with the communications network, enrollment data of the plurality of users, wherein the enrollment data includes at least contact information of the users; receiving, via the communications network, a discount offer, wherein the discount offer comprises at least a product or service description, an initial price, a first discount price less than the initial price, a first minimum number of acceptances of the discount offer that are required to trigger the first discount price, a second discount price less than the first discount price, a second minimum number of acceptances of the discount offer that are required to trigger the second discount price, and a time deadline for the discount offer; transmitting, via the communications network, computer program code and the discount offer only to the mobile computers of the users that have provided enrollment data to the server, wherein the computer program code comprises a countdown timer that counts down to the time deadline for the discount offer; receiving, via the communications network, acceptances of the discount offer from the mobile computers of the users; detecting attainment of a predefined time before the time deadline; and responsive to detecting attainment of the predefined time before the time deadline, executing the following steps at the predefined time before the time deadline: calculating a number of acceptances of the discount offer at the predefined time before the time deadline, wherein the number of acceptances is calculated to be less than the second minimum number of acceptances, but greater than the first minimum number of acceptances; decreasing the second minimum number of acceptances by a predetermined numerical decrement; increasing the time deadline by an increment of time; and re-transmitting, via the communications network, the discount offer with the decreased second minimum number of acceptances and the increased time deadline only to the mobile computers of the plurality of users that provided enrollment data to the server.

10. The method of claim 9, further comprising:
decreasing the second discount price by a monetary decrement; and
re-transmitting the discount offer with a decreased second discount price only to the mobile computers of the plurality of users that have provided enrollment data to the server.

11. The method of claim 9, further comprising:
increasing the number or amount of products or services by an increment of time; and
re-transmitting the discount offer with an increased number or amount of products or services only to the mobile computers of the plurality of users that have provided enrollment data to the server.

12. The method of claim 9, further comprising:
detecting passage of a predefined period of time;
detecting attainment of the time deadline;
calculating a number of acceptances of the discount offer, wherein the number of acceptances is calculated to be greater than or equal to the second minimum number of acceptances of the discount offer; and
effectuating a sale of the product or service of the discount offer at the second discount price to each user that accepted the discount offer.

13. The method of claim 12, further comprising:
attributing at least one sale of the product or service to a first user who entered enrollment data into the server for a buyer of the at least one sale, so as to award a commission to the first user.

14. The method of claim 12, further comprising:
transmitting a current number of acceptances of the discount offer only to the mobile computers of the plurality of users that have provided enrollment data to the server, via the communications network.

15. The method of claim 12, wherein the step of transmitting the discount offer further comprises:
transmitting computer program code only to the mobile computers of the plurality of users that have provided enrollment data to the server, together with the discount offer, wherein the computer program code comprises a countdown timer that counts down to the time deadline and displays a current number of acceptances of the discount offer.

16. The method of claim 15, further comprising:
receiving a request, via the communications network, from the computer program code in a first mobile computer of the plurality of users, for local time at the server; and
transmitting a message, via the communications network, to the first mobile computer, wherein the message includes the local time at the server.

17. The method of claim 16, wherein the step of transmitting the discount offer further comprises:
transmitting the discount offer only to the mobile computers of a plurality of users that have provided enrollment data to the server, and that possess attributes that match a given description for one or more of the following attributes: account status, age, sex, income range, marital status, previous buying behavior.

* * * * *